United States Patent [19]

Hoffer et al.

[11] Patent Number: 5,613,030
[45] Date of Patent: Mar. 18, 1997

[54] HIGH DENSITY FIBER OPTIC INTERCONNECTION ENCLOSURE

[75] Inventors: John C. Hoffer, Harrisburg; Carl M. Bruckner, Washington, both of Pa.; Jon M. Orrell, Oregon City, Oreg.; Paula J. Parke, Elizabethtown, Pa.

[73] Assignee: The Whitaker Corporation, Wilmington, Del.

[21] Appl. No.: 441,504

[22] Filed: May 15, 1995

[51] Int. Cl.⁶ ........................................... G02B 6/36
[52] U.S. Cl. .................................................. 385/135
[58] Field of Search ................................ 385/134, 135

[56] References Cited

U.S. PATENT DOCUMENTS

| | | | |
|---|---|---|---|
| 4,805,979 | 2/1989 | Bossard et al. | 350/96.2 |
| 4,824,196 | 4/1989 | Bylander | 350/96.2 |
| 4,900,123 | 2/1990 | Barlow et al. | 350/96.2 |
| 4,971,421 | 11/1990 | Ori | 350/96.2 |
| 5,046,811 | 9/1991 | Jung et al. | 385/15 |
| 5,052,775 | 10/1991 | Bossard et al. | 385/76 |
| 5,074,635 | 12/1991 | Justice et al. | 385/95 |
| 5,121,456 | 6/1992 | Essert et al. | 385/70 |
| 5,134,678 | 7/1992 | Essert | 385/86 |
| 5,167,001 | 11/1992 | Debortoli et al. | 385/135 |
| 5,231,687 | 7/1993 | Handley | 385/139 |
| 5,247,603 | 9/1993 | Vidacovich et al. | 385/135 |
| 5,337,400 | 8/1994 | Morin et al. | 385/135 |
| 5,363,465 | 11/1994 | Korkowski et al. | 385/135 |
| 5,363,467 | 11/1994 | Keith | 385/135 |
| 5,367,594 | 11/1994 | Essert et al. | 385/70 |
| 5,367,598 | 11/1994 | Devenish, III et al. | 385/135 |
| 5,412,497 | 5/1995 | Kaetsu et al. | 385/135 |
| 5,412,751 | 5/1995 | Siemon et al. | 385/135 |
| 5,420,958 | 5/1995 | Henson et al. | 385/135 |

FOREIGN PATENT DOCUMENTS

| | | | |
|---|---|---|---|
| 0368445 | 5/1990 | European Pat. Off. | G02B 6/46 |
| WO91/18311 | 11/1991 | WIPO | G02B 6/44 |

OTHER PUBLICATIONS

*3M Product Bulletin,* "2400 Series High Density Fiber Optic Cross–Connect System (Rack Mount)", 4 pages 1992; 3M Telecom Systems Group, Austin, TX.
*3M Brochure,* "2300 Fiber Termination Module (FTM)", 6 pages; 1993; 3M Telecom Systems Group, Austin, TX.
*AMP Brochure,* "AMP Termination & Distribution Unit (ATDU)", 2 pages; 1993; AMP Incorporated, Harrisburg, PA.
*Bejed Catalog,* "Interfaces Data & Telecom Special Designs", 42 pages; 1993–1994; Bejed Communication Products, Portland, OR.
*AMP Brochure,* "Corelink Splice", 2 pages; 1994; AMP Incorporated, Harrisburg, PA.
*Hartwell Product Drawing No. HRN 6,* "1/4 Turn Nylatch", May 11, 1982; The Hartwell Corporation, Placentia, California.
*Rogers Data Sheet,* "PORON Cellular Urethanes", five pages 1991; Rogers Corporatiion, East Woodstock, CN.

*Primary Examiner*—John Ngo
*Attorney, Agent, or Firm*—Anton P. Ness

[57] ABSTRACT

An enclosure (10) of the type having a patch panel (56) mountable at an interior location spaced inwardly a selected distance from a front opening (22). A card region (50) behind patch panel (56) receives splice cards (100) or connector cards (200) slidably along pairs of card guides (62, 64). Splice cards (100) include splice connectors (130) along front face (126) for directly splicing first fiber ends (132) to second fiber ends (138) at patch panel (56) in a manner permitting easy unsplicing and resplicing, enabling a high density of optical interconnections. Connector cards (200) provide connectors for mating terminated fiber ends, permitting unmating thereof. A forward, latchable card position is provided facilitating fiber interconnection therewith forwardly of in-service latched positions of adjacent cards. Fiber exits (314) are provided for direct routing of fibers between stacked enclosures (300).

14 Claims, 8 Drawing Sheets

HIGH DENSITY FIBER OPTIC INTERCONNECTION ENCLOSURE

FIELD OF THE INVENTION

The present invention relates to the field of enclosures and more particularly to enclosures for termination and interconnection of signal carrying cables such as fiber optic cables.

BACKGROUND OF THE INVENTION

Enclosures are known in which a vertical panel is fixedly mounted within an enclosure spaced inwardly a selected distance from the opening along the front. A variety of devices such as fiber optic connectors may be mounted to the panel, commonly referred to as a patch panel, and access to the panel to connect cables thereto is permitted by a door mounted across the opening that may be lowered by pivoting about hinges along the door bottom at both ends whereby the door remains secured to the framework of the enclosure.

One such enclosure is disclosed in U.S. patent application Ser. No. 08/254,301 filed Jun. 6, 1994 and assigned to the assignee hereof. The enclosure provides a patch panel that is removably mounted to flanges extending into the interior of the enclosure at the spaced inward location. The manner of fastening the patch panel at the interior location is selected to match the manner of removably fastening the door to the enclosure at its front opening. The patch panel may be mounted at the front opening facilitating access to the cable connections to permit frequent changes in the desired connections, such as in test equipment where different apparatus desired to be tested may require different cable connections for each test to be performed thereon. Also disclosed are fasteners of the type easily actuated manually for fastening and unfastening without tools and wherein the fastener elements remain loosely secured to the patch panel eliminating the possibility of lost pieces during placement or removal of either the panel or the door.

It is desired to provide an enclosure compact in size and providing for interconnection of a large number of discrete optical fiber lines, in a high density arrangement, allowing convenient connection and disconnection capability.

SUMMARY OF THE INVENTION

The present invention is an enclosure for fiber optic interconnection at a patching interface adapted for convenient disconnection and reconnection. The enclosure provides a card-receiving region enabling convenient card insertion and removal from either the front or back of the card-receiving region. The card-receiving region is defined between upper and lower frames having card guide channels extending rearwardly from a patch panel spaced inwardly from the front face-of the enclosure, and card latching members are provided at the front of the cards enabling manual actuation from the front for delatching from the upper frame when desired for front or rear removal of a card. Several types of cards are also provided mountable therein, including: a high density splice card of the present invention for interconnection of twelve optical fibers of either discrete fiber cable or ribbon cable using splice connectors such as disclosed in U.S. Pat. No. 5,121,456; and a fiber optic connector card providing two fiber optic connector ports for conventional individually terminated optical fibers, or a double width connector card providing four connector ports and utilizing two card sites. The framework of the card-receiving region preferably provides a second latchable position for each card forwardly of its in-service latched position, allowing access to connectors of the card and clearance from adjacent cards for manual and tool-assisted fiber interconnection, in an array of closely spaced cards.

In another embodiment of enclosure of the present invention, the top and bottom covers are each provided with a transverse section easily unfastened and refastened from the panel to define a cable exit proximate the enclosure front. The transverse sections and the adjacent cover portions are provided with a pair of easily compressible elastomeric inserts compressed against each other to close off the cable exits while enabling one or more optical fibers or fiber optic cables from the interconnection interface to be directed upwardly or downwardly therethrough for interconnection to a like interface of a like enclosure positioned atop or beneath the enclosure, without requiring additional space for exiting of the cables to the side of the enclosure or interfering with other cables entering the front of the enclosure.

It is an objective of the present invention to provide a high density fiber optic interconnection enclosure, for interconnecting a large plurality of fiber optic lines at a common interface in a compact space.

It is another objective to provide interconnection cards adapted to be used with the enclosure for either splice connections or conventionally terminated optical fibers.

It is yet another objective to provide a compact splice connection card providing for splicing of a plurality of optical fiber lines in a manner permitting and facilitating unsplicing and resplicing of the lines at the interconnection interface.

It is further an objective to provide a card-receiving region adapted to provide a second card position forwardly of an in-service position, to permit access to the card front for manual and tool-assisted fiber interconnection, in a closely spaced card array.

It is still another objective to provide a high density enclosure providing for protected direct interconnection of one or more selected optical fiber lines with others in an adjacent enclosure without requiring additional clearance space adjacent the enclosure for exiting fibers or cables or for accessories for protecting same, thereby allowing for a stacked array of enclosures.

Embodiments of the present invention will now be described by way of example with reference to the accompanying drawings.

DETAILED DESCRIPTION OF THE PREFERRED EMBODIMENT

FIGS. 1 to 4 illustrate an enclosure 10 having side walls 12,14, a top wall 16 and a bottom wall 18 extending rearwardly to a rear opening 20 from a front opening 22 at leading wall edges, to define an interior region, with the walls formed for example of aluminum. Front panel 24 and rear panel 26 (FIG. 4) are mountable to traverse front and rear openings 22,20 and are adapted to be easily removed, if desired, and preferably are transparent such as of clear polycarbonate plastic. Enclosure 10 includes openings or exits 28 at selected locations for entry and exit of cables (not shown). A rear cable management tray 30 is slidably mounted along the bottom of the interior region and is adapted to be pulled out from rear opening 20 as in FIGS. 1 and 2, and has arcuate cable guide brackets 32 for cable management or alternatively could be provided with an array of cable ties affixed thereto (not shown).

Figure 1:
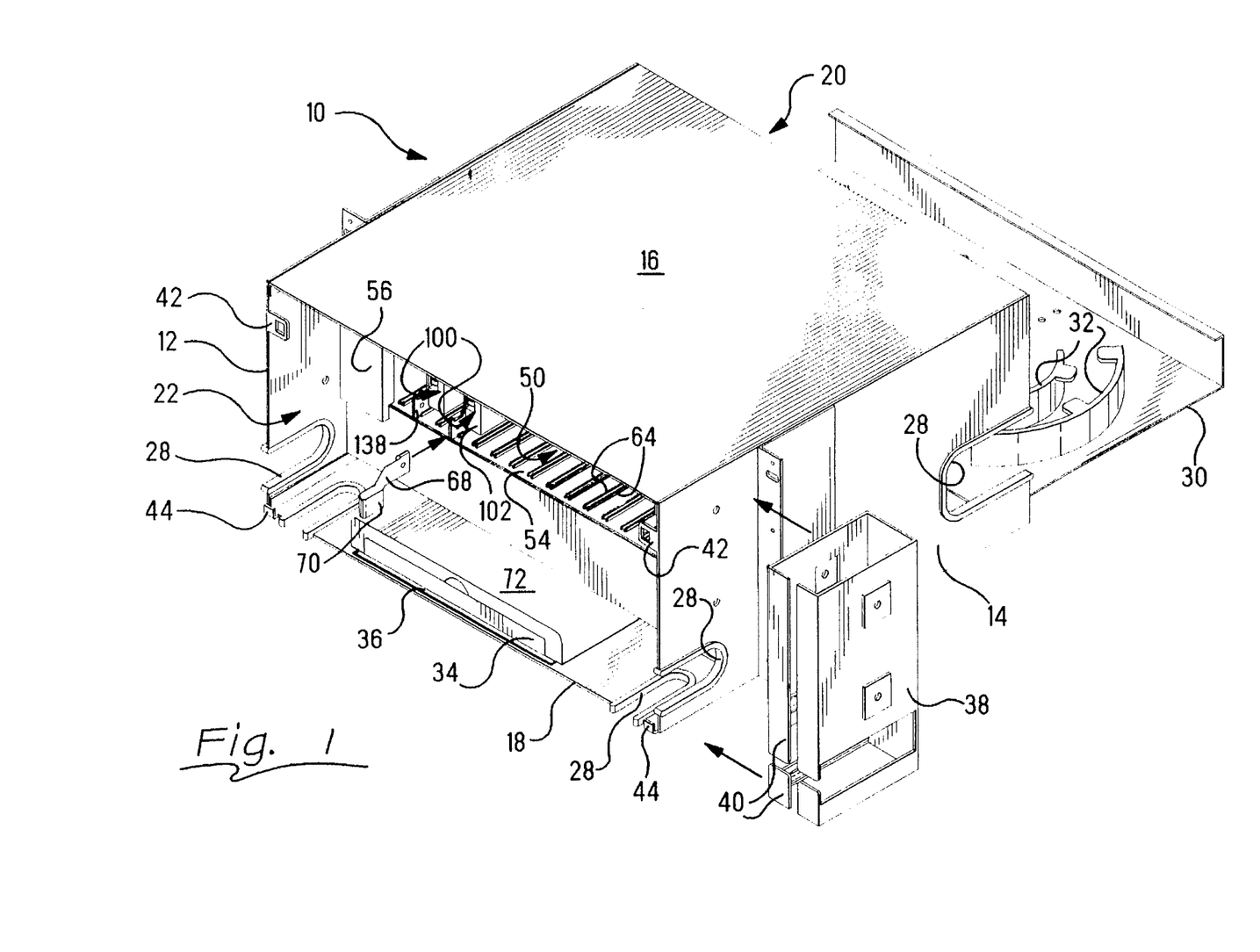
FIGS. 1 and 2 are isometric views of the enclosure of the present invention with the front and rear panels removed and with a rear cable management tray shown pulled out, with FIG. 1 showing the interconnection card-receiving region with representative cards therein in the interior and also fiber management clip and an attachable cable management accessory exploded therefrom.
Figure 2:
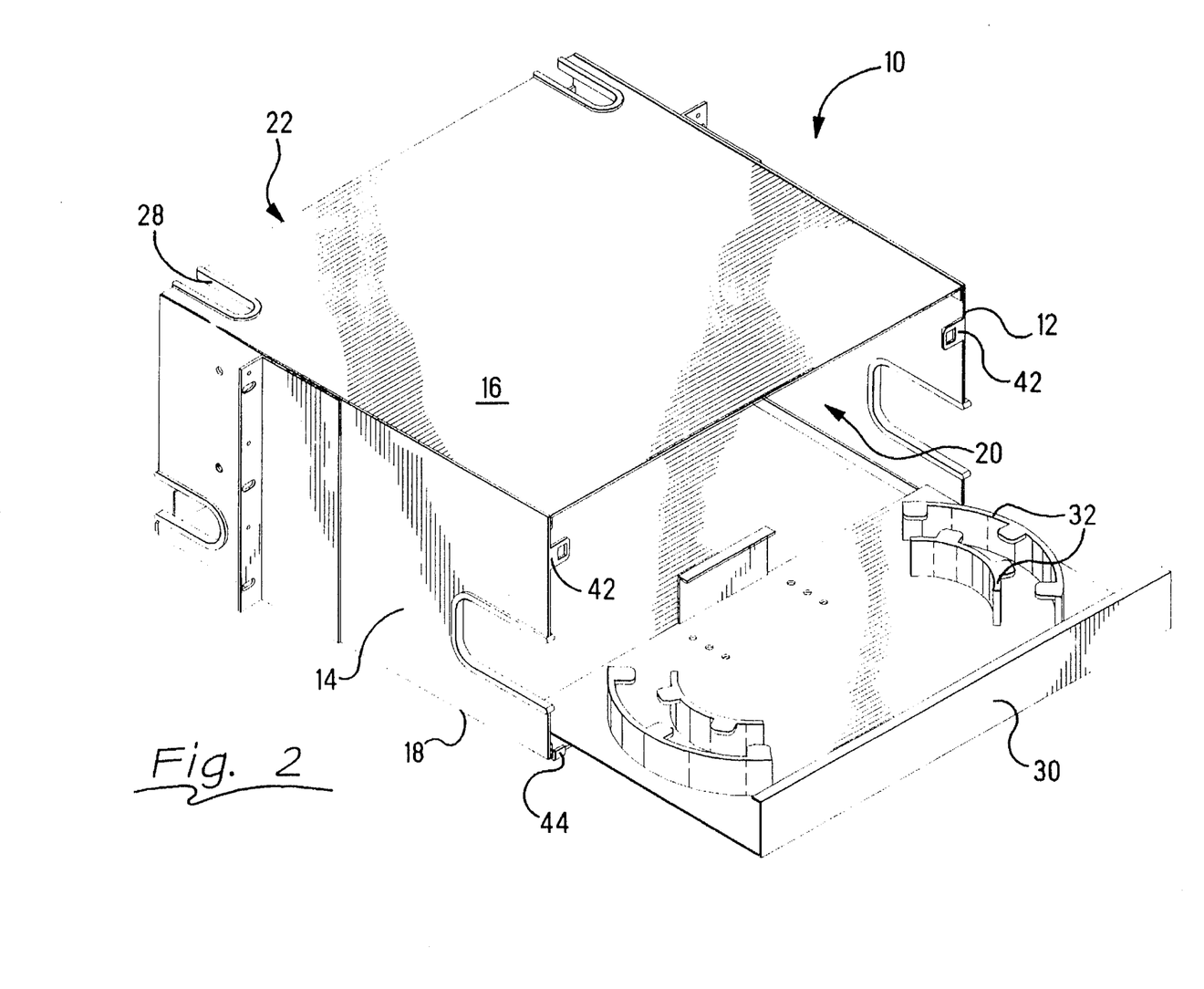

A forward work tray 34 having a low height front flange is provided adapted to be pulled outwardly partially through front opening 22. A low profile labeling tray 36 is also provided that contains labeling across its upwardly facing surface having an embossment underneath its front edge accessible through a small cutout in bottom wall 18 at front opening 22, for identifying particular cards, fibers and interconnection location, and displaying other information. Optionally, a cable management accessory 38 may be attached such as by screws to the outside surface of each side wall 12,14 adjacent the front of the enclosure for vertical routing of cables exiting at cable exits 28 thereat, and including arcuate cable-engagement brackets 40 within the accessory adjacent the opening aligned with cable exit 28 of the enclosure, to protect and control bending of the cables thereat. Further, cable anchor brackets (not shown) may be mounted on outside surfaces of side walls 12,14 near the rear cable exits, for securing fiber cables adjacent the exits. As an alternative to a slidable rear cable management tray 30, a rear door (not shown) may be hinged fastened across rear opening 20 to be lowered and contain arcuate cable guide brackets or cable tie brackets; use of such a hinged rear door permits the enclosure to be reduced in height, since no space need be defined for storing a slidable rear tray.

Figure 4:
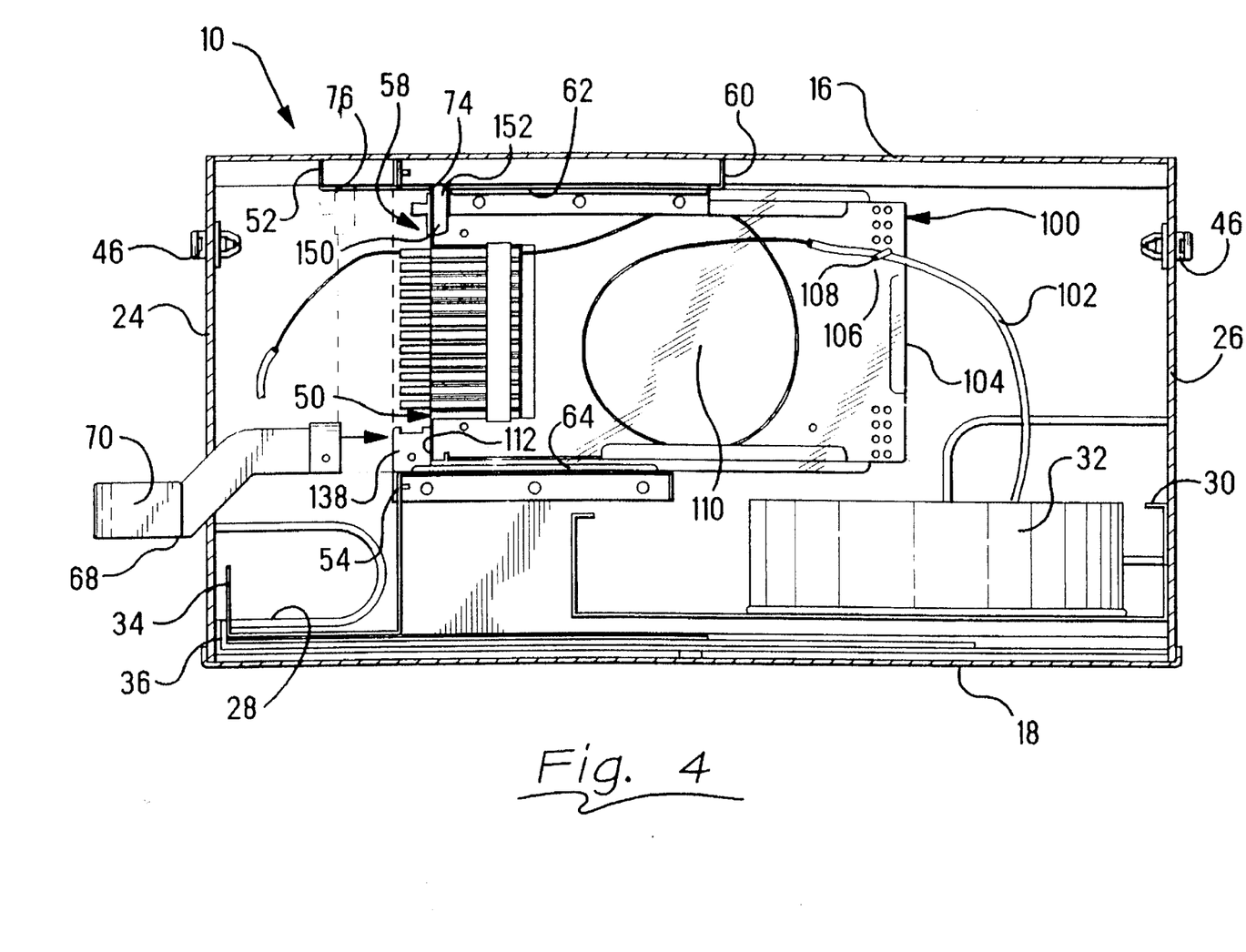
FIG. 4 is a side elevation view of the interior of the enclosure of FIG. 1 showing a representative card with representative fiber cables secured thereto, the card being secured in the card-receiving region in its in-service latched position with a second latchable card position forwardly thereof shown in phantom.

For mounting of front and rear panels 24,26, apertured mounting tabs 42 of side walls 12,14 are shown near the top of front and rear openings 22,20 while upstanding restraining tabs 44 are provided along the bottom edge so that the lower edge of the panel is positioned therebehind while fasteners 46 are used to secure the panel to mounting tabs 42. One type of fastener especially suitable for use with the present invention is a quarter turn one-piece fastener sold by The Hartwell Corporation of Placentia, Calif. under the product identification NYLATCH, disclosed in U.S. Pat. No. 3,964,364, with the fastener 46 adapted to self-retain to one of two parts being fastened and unfastened. As is more particularly disclosed in U.S. patent application Ser. No. 08/254,301 filed Jun. 6,1994 and assigned to the assignee hereof, fastener 46 is utilized by latching legs extending through a respective apertured mounting tab 42 when in an unlocked state, and an actuator rotatable through a quarter turn by a suitable tool (not shown) in turn activating a cam that spreads ends of the legs beyond the mounting tab, to lock the panel to the enclosure.

Figure 3:
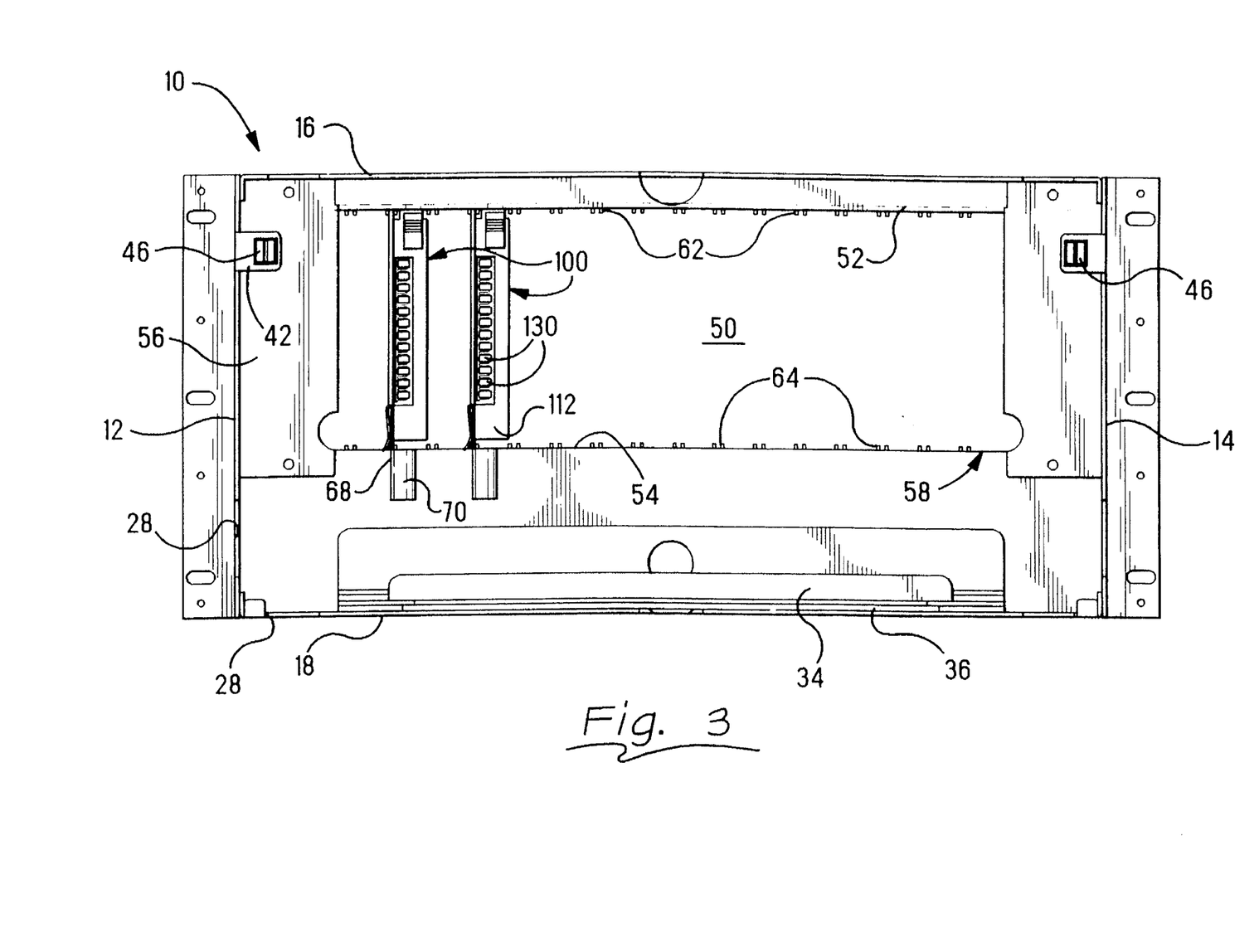
FIG. 3 is a front elevation view of the interconnection card-receiving region of FIG. 1 with representative fiber optic interconnection cards mounted therein.

Defined within enclosure 10 is a card-receiving region 50 formed by framework having upper and lower frames 52,54 extending from a patch panel 56 past an interconnection interface 58 to a rear face 60 and providing pairs of opposed upper and lower card guides 62, 64 at each card site. Card guides 62,64 may simply be pairs of parallel ribs embossed into the thin metal plates comprising the upper and lower frames. In FIGS. 3 and 4 is shown the interconnection interface 58 near patch panel 56 at the front of the card-receiving region 50, and a representative card 100 mounted in its in-service position in the card-receiving region 50 within an associated pair of card guides 62,64 along upper and lower frames 52,54. A second position is shown in phantom forwardly of the in-service position, adjacent patch panel 56. First fiber optic cables 102 enter the card from rear end 104 thereof, with the card providing cable securing plates 106 for fastening of cable ties 108 thereat, to secure a jacketed cable portion to the card. Card 100 provides a large central region 110 for generous loops of the cable fibers to be conveniently placed in and protected by the card as ends of the cable fibers enter splice connectors 130 at front end 112 of the card.

Fiber management clips 68 preferably are utilized at the interconnection interface to direct the fibers (or cables) downwardly from their interconnection with splice connectors of a splice card 100 (or terminal-receiving connectors 210 shown in FIGS. 7 and 8 with a connector card 200); clips 68 may be secured to each card at a forwardly extending tab 138 at the lower end of front end 102 of card 100 and include a forwardly- and downwardly-offset U-shaped section 70 within which the fibers (or cables) may be dressed to be directed downwardly into a cable management trough 72 at the lower front of the enclosure.

Figure 5:
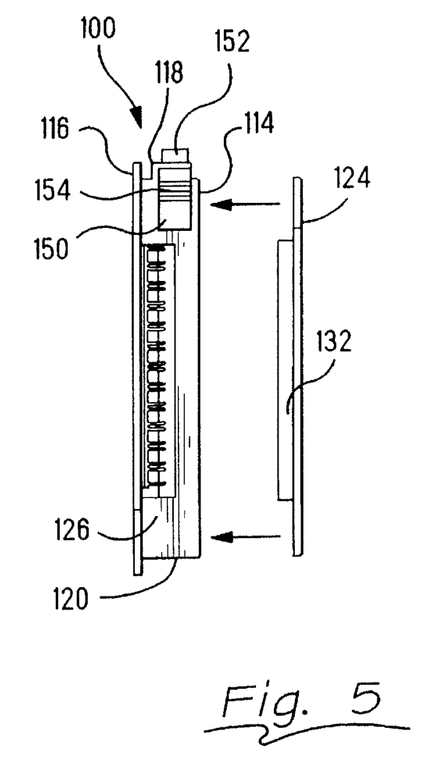
FIGS. 5 and 6 are front and side elevation views of a fiber optic splice card mountable in the card-receiving region of the enclosure of FIGS. 1 to 4, with a transparent side cover and representative fiber optic cables shown.
Figure 6:
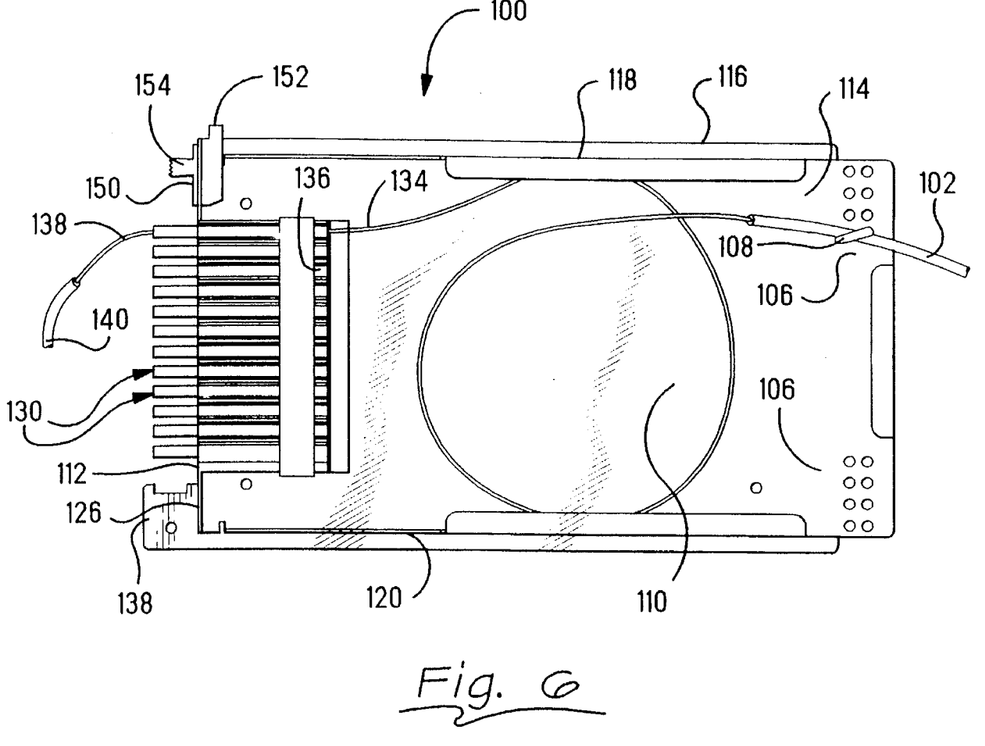

In FIGS. 5 and 6 is seen in greater detail fiber optic splice card 100 of the present invention, for providing interconnections of twelve discrete optical fiber lines as shown. Card 100 includes a tray member 114 affixed to a base plate 116 defining one major side of the card, with tray member 114 providing upper and lower wall sections 118,120 of the card and a rear partial wall section 122 allowing for cable entry therebeside. The other major side of card 100 preferably comprises a transparent panel 124 removable affixable across the open face of tray member 114 to permit visual inspection of the fiber arrangement within the card. Mounted in a holder of front face 126 at front end 112 of splice card 100 are twelve splice connectors 130 of the type disclosed in U.S. Pat. No. 5,121,456, with an elastomeric or foam rubber portion 132 of panel 124 serving to maintain connectors 130 in position in their respective compartments of the rack. Preferably, splice connectors 130 are CORELINK splicers, a product having Part No. 503577-1 and holders therefore, Part No. 559066-1, sold by AMP Incorporated, Harrisburg, Pa. Each connector 130 has a pair of elongate transparent plastic body halves assembled together and fused, and a pair of metallic splice elements are contained therein centered between opposed fiber-receiving ends of the connector and are spring biased together, with a fiber-receiving passageway extending through the connector and between the splice elements; using a tool inserted into tool-receiving aperture at a respective end, the splice elements are temporarily pried apart at a corresponding end to permit insertion of a fiber end into one end of the splice elements until disposed therebetween, after which the tool is removed permitting the splice elements to clamp a clad portion of the fiber adjacent the end and to hold the fiber end in one end of a common alignment channel such as a small-dimensioned V-groove aligned with the fiber-receiving channel, all without disturbing a fiber end previously inserted in the opposed connector end and splice element end.

Either discrete first fiber optic cables 102 may be brought into the rear end of splice card 100 and ends of first optical fibers 134 thereof to be optically mated are secured in respective ones of splice connectors 130 along rearward sections 136 thereof, or a single ribbon cable having twelve optical fibers therein may be brought in, as desired. Splice connectors 130 provide for unterminated ends 138 of the optical fibers of second cables 140 to be inserted into forward ends 142 thereof at interconnection interface 58 of enclosure 10 (FIGS. 3 and 4), and through use of a simple tool, splice connections are made to first optical fiber ends 130 which connections can easily be disconnected for removal of the second optical fiber ends 138 when desired, followed by reconnection if desired. Card 100 also preferably includes a fiber management clip 68 securable onto tab 138 and with U-shaped section 70 of clip 68 defining a channel through which fibers interconnected to splice connectors 130 may be routed downwardly toward a cable management region 72 adjacent bottom wall 18 of enclosure 10 to maintain orderly organization of fibers and cables forwardly of interconnection interface 58 and permit unhindered visual inspection of the interconnections at the interface.

Also seen in FIGS. 5 and 6 is a latch member 150 mounted to a front face 126 of card 100 and includes a latching projection 152 along its upper end protruding beyond upper wall section 118 of the card when latch member 100 is in its normal, upwardly spring biased position. Latching projection 152 cooperates with two latching apertures 74,76 along upper frame 52 spaced between adjacent card guides 62 to secure card 100 in position in card-receiving region 50, with second aperture 76 being spaced forwardly of first aperture 74 to provide for latching of a card in a second position projected forwardly of the in-service positions of adjacent cards to permit manual and tool-assisted access to the connectors along front face 126 of the card without interference from cables and fibers interconnected with cards at adjacent card sites closely spaced from the subject card site. A forwardly extending actuator 154 is adapted to be manipulated downwardly to move the latch member downwardly a short distance in order to disengage latch projection 152 from latching engagement within a latching aperture of the card guide. Upon latch disengagement, card 100 is released to be removed from card-receiving region 50 by being pulled forwardly or rearwardly therefrom.

Figure 7:
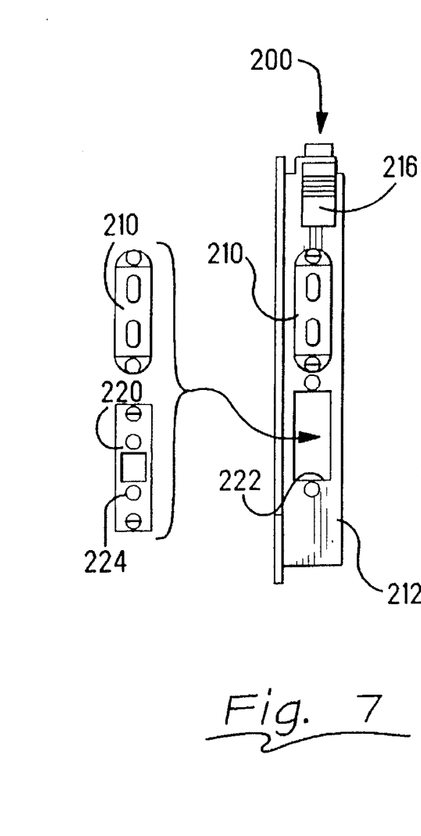
FIGS. 7 and 8 are front and side elevation views of a fiber optic connector card mountable in the card-receiving region of FIGS. 1 to 4, with representative fiber optic cables.
Figure 8:
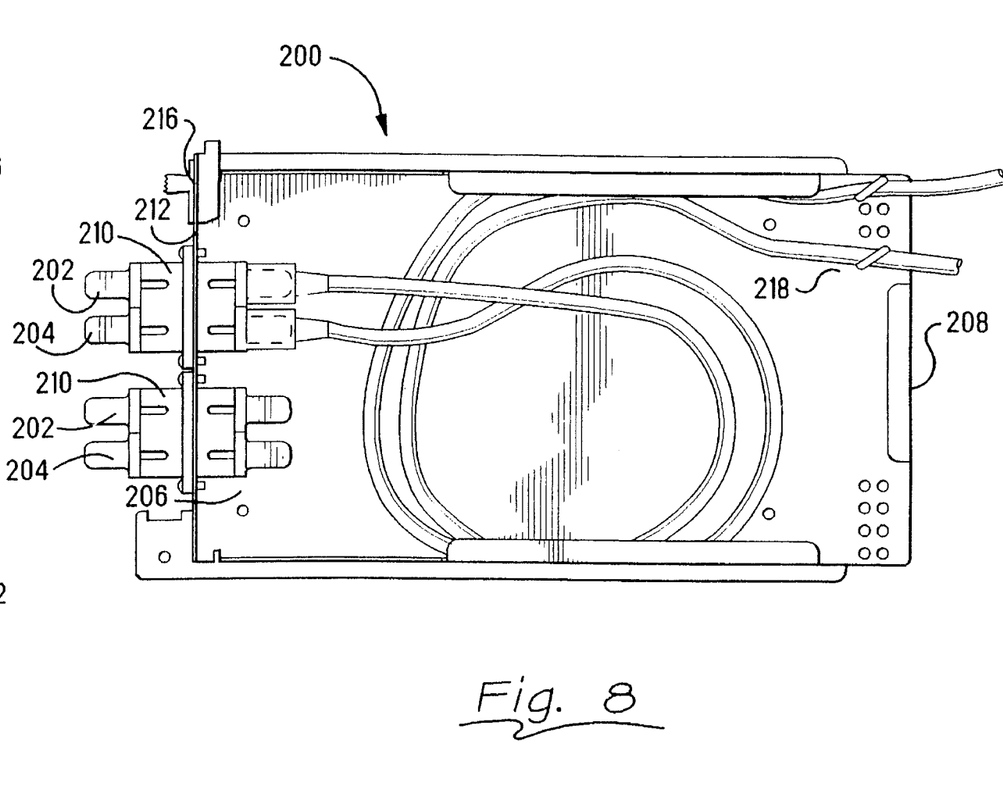

In FIGS. 7 and 8, a fiber optic connector card 200 is shown providing four connection ports 202, 204 at front end 206 for interconnection of four optical fiber lines. Discrete first fiber optic cables are brought into the card from rear end 208, with terminals of the cables securable into duplex (or two-fiber) housings 210 mounted to front face 212 at front end 206. Such duplex housings and terminals may be conventional such as are sold by AMP Incorporated, Harrisburg, Pa. under Part Nos. 502632-5 and 503554-1. Connection ports 202,204 are adapted to receive terminated ends of second fiber optic cables 214 brought into the front of the enclosure (FIG. 1) to be mated with the terminated ends of the first cables at interconnection interface 58 of the card-receiving region (FIGS. 3 and 4). Connector card 200 is also provided with a latch member 216 similar to latch member 134 of FIGS. 5 and 6, and similarly operable, and also cable securing plates 218 similar to those in FIG. 6. A cover plate 220 may be fastened to front face 212 if desired to modify a selected one of the two large housing-receiving openings 222 comprising a small housing-receiving opening 224 to accommodate a smaller simplex (or single fiber) connector of conventional design (such as Part No. 502632-4 sold by AMP Incorporated), or to cover all openings where no connector is to be mated and thus where no connector housing is being mounted.

Figure 9:
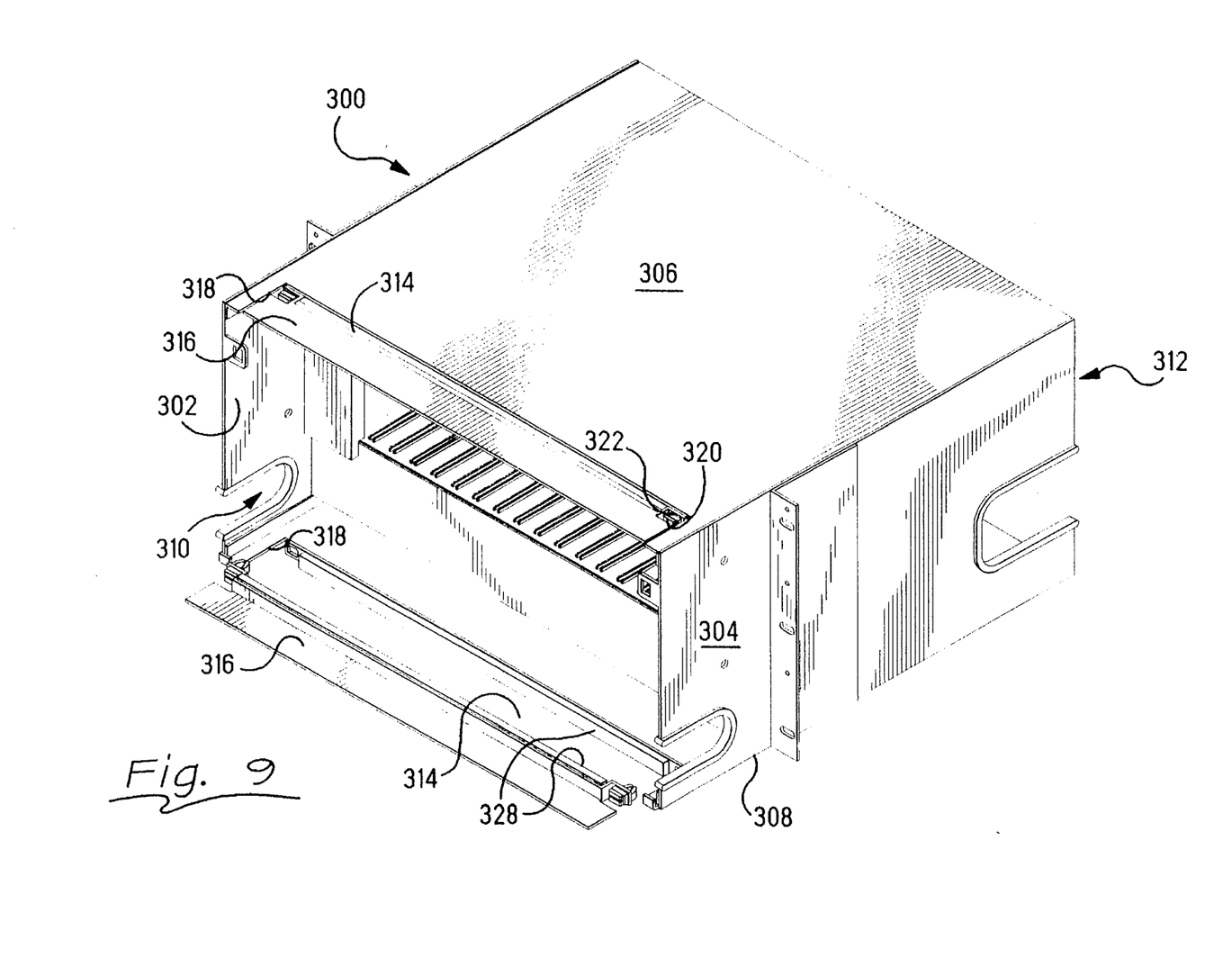
FIG. 9 is an isometric view of an alternate embodiment of the enclosure of the present invention having upper and lower cable exits facilitating fiber optic interconnection with an adjacent enclosure positionable atop or beneath the subject enclosure.
Figure 10:
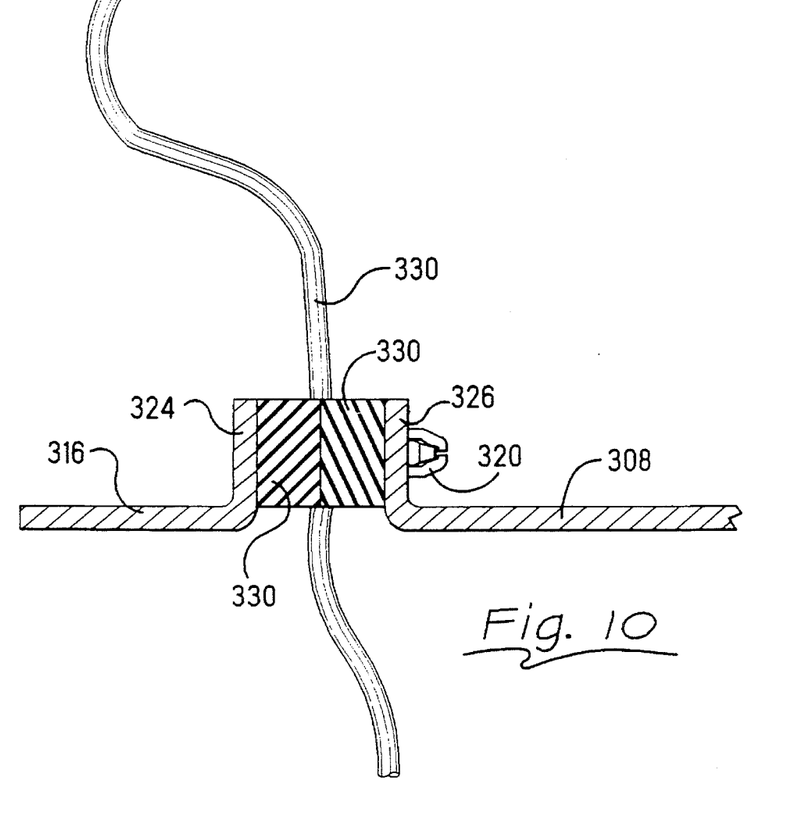
FIGS. 10 and 11 are cross-section and side views of the cable exit with a representative optical fiber extending therethrough.
Figure 11:
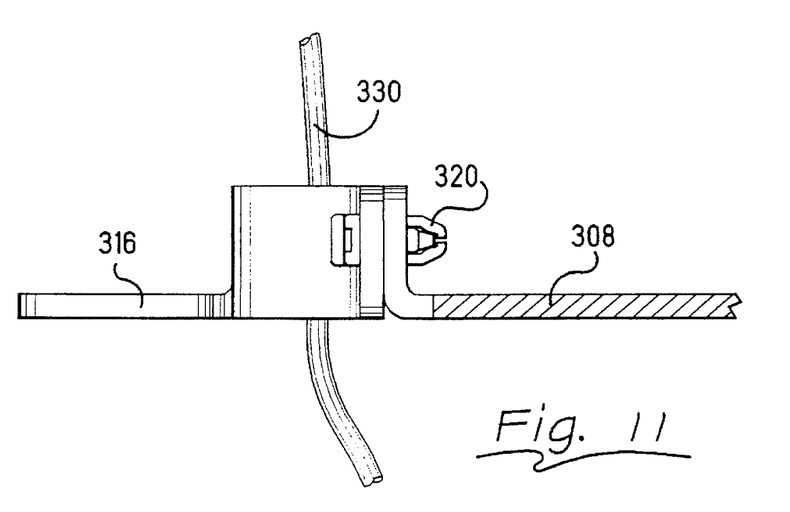

FIGS. 9 to 11 disclose an alternate embodiment of enclosure 300 similar to enclosure 10 of FIGS. 1 to 4. Enclosure 300 includes side walls 302,304 and top and bottom walls 306,308 extending between front and rear openings 310,312. Upper and lower fiber exits 314 are defined through front portions of top and bottom walls 306,308 adjacent front opening 310, with the fiber exits being closed off. A wall portion 316 is complementary to a cutout 318 in top or bottom wall 306,308 and is fastenable to the frame of enclosure 300 and preferably is fastenable directly to the top or bottom wall using fasteners 320 and mounting tabs 322 similar to fasteners 46 of FIGS. 1 to 4 and mounting tabs 42 of the top and bottom wall, with wall portion 316 thus being easily unfastened and refastened if desired. Each wall portion 316 includes an upstanding wall section 324 and the top and bottom walls also include upstanding wall sections 326 opposed from upstanding wall sections 324, all directed inwardly into the enclosure in spaced apart pairs.

Inserts 328 of elastomeric material are affixed to surfaces of upstanding wall sections 324,326 in adjacent pairs, defining virtual slots therebetween. Preferably the elastomeric material is a microcellular foam such as PORON high density microcellular open celled urethane, Product No 4701-01, sold by Poron Materials Division of Rogers Corporation of East Woodstock, Conn. Fibers or fiber cables 330 interconnected to a port of a card at the interconnection interface may be directed outwardly from enclosure 300 through a fiber exit 314, with elastomeric inserts 328 gently compressing against such a fiber or fiber cable without deformation thereof, and also abut against each other away from the fiber or fiber cable to close off the exit. Thus, selected optical fibers or fiber cables may be directed from enclosure 300 "through" the top or bottom wall to another like enclosure directly above or directly beneath it without requiring any space adjoining either enclosure, permitting stacking of an array of enclosures in a minimal space with the fibers and fiber cables being physically protected from being exposed outside an enclosure and thus being susceptible to being snagged and damaged. Such an enclosure 300 may be used in a stack dedicated to such direct fiber interconnection utilizing fiber exits 314, and may be fabricated to eliminate the cable management tray and trough thus greatly reducing the height of the enclosure to little more than the height of the card-receiving region, and thus defining a compact high-density stack of enclosures.

An enclosure has been defined wherein a card-receiving region may receive fiber interconnection cards of different types, including a double width card occupying two card sites, but wherein the enclosure of the present invention is especially suitable for high density interconnection now available as a result of the splice connector disclosed in U.S. Pat. No. 5,121,456. Variations and modifications may be made to the specific embodiment disclosed herein, that are within the spirit of the invention and the scope of the claims.

We claim:

1. An enclosure for interconnection of optical fibers at an interconnection interface, comprising:

a frame having opposed side walls and a top wall and bottom wall extending between front and rear openings to define an interior work space;

a card-receiving region defined within said frame and extending rearwardly to a rear face from an interconnection interface spaced inwardly from said front opening, said card-receiving region including pairs of opposed card guides extending along opposed frame members of said frame, said card guides of said pairs being spaced across said interconnection interface to define card sites for receipt of respective cards therein slidable along said pairs of opposed card guides;

an array of cards associated with respective ones of said card sites such that front faces of said cards are exposed along said interconnection interface and rearward ends thereof are positioned at said rear face of said card-receiving region, said cards including upper and lower edge portions insertable into and along pairs of said card guides at said card sites; and each said card including a latch member adjacent a respective one of said associated pair of card guides and along said front face of said card and manually actuable from forwardly thereof, said latch member adapted to cooperate with cooperable latching sections of one of said opposed frame members to latch said card in a selected one of first and second positions spaced apart along said one of said frame members proximate said interconnection interface.

2. An enclosure as set forth in claim 1 wherein said latch member is normally spring biased in a direction toward the adjacent said one of said frame members and includes a latch projection received into one of a pair of apertures spaced apart along a respective one of said frame members to latch said card in said selected one of said first an second positions.

3. An enclosure as set forth in claim 2 wherein said latch member includes an actuator portion protruding therefrom and extending forwardly of said front face of said card to be accessible along said interconnection interface, enabling actuation to move said latch member against spring bias away from said one frame member to move said latch projection from said aperture and permitting said card to be slid along said pair of card guides.

4. An enclosure for interconnection of optical fibers at an interconnection interface, comprising:

a frame having opposed side walls and a top wall and bottom wall extending between front and rear openings to define an interior work space;

a card-receiving region defined within said frame and extending rearwardly to a rear face from an interconnection interface spaced inwardly from said front opening, said card-receiving region including pairs of opposed card guides spaced across said interconnection interface to define card sites for receipt of respective cards therein slidable along said pairs of opposed card guides; and an array of cards associated with respective ones of said card sites such that front faces of said cards are exposed along said interconnection interface and rearward ends thereof are positioned at said rear face of said card-receiving region, said cards including upper and lower edge portions insertable into and along pairs of said card guides at said card sites;

at least one said card including an array of splice connectors affixed thereto, each said splice connector being of the type adapted to independently receive into respective ends thereof end portions of respective unterminated optical fibers to be clamped into respective co-aligned positions to define an optical splice connection therebetween, each said splice connector being affixed at said front card face such that first connector ends are exposed along said front card face for tool-assisted receipt thereinto of respective first fiber ends for splicing to respective second fiber ends previously secured along said card rearwardly of said front face and into second connector ends.

5. An enclosure as set forth in claim 4 wherein said at least one splice card includes twelve said splice connectors.

6. An enclosure as set forth in claim 4 wherein said array of cards includes at least one connector card including housings mounted to said front face thereof defining ports adapted to receive thereinto from rearward ends thereof terminals terminated onto ends of first optical fibers of first fiber optic cables secured within said card, and said ports being adapted to receive thereinto from forward ends along said interconnection interface, terminals terminated onto ends of second optical fibers of second fiber optic cables.

7. An enclosure as set forth in claim 6 wherein one said housing for receipt of two terminals into said forward end thereof is mounted to said front face of said at least one connector card traversing a large opening through said front face for said housing, and a cover plate is mounted to said front face traversing another large opening thereof in lieu of a said two-terminal housing thereat.

8. An enclosure as set forth in claim 7 wherein said cover plate includes a small opening therethrough for mounting a housing for receipt of one terminal into said forward end thereof.

9. An enclosure as set forth in claim 4 wherein said frame includes a cable management tray disposed in a stored position under said card-receiving region and slidable rearwardly through said rear opening.

10. An enclosure as set forth in claim 4 wherein said frame includes a cable management trough defined near said bottom wall forwardly of said interconnection interface.

11. An enclosure as set forth in claim 10 wherein said frame includes a work tray disposed beneath said cable management trough when in a stored position and slidable forwardly through said front opening.

12. An enclosure as set forth in claim 11 wherein said frame includes a label tray disposed adjacent said bottom wall beneath said work tray when in a stored position and slidable forwardly through said front opening.

13. An enclosure for interconnection of optical fibers at an interconnection interface, comprising:

a frame having opposed side walls and a top wall and bottom wall extending between front and rear openings to define an interior work space;

a card-receiving region defined within said frame and extending rearwardly to a rear face from an interconnection interface spaced inwardly from said front opening; and upper and lower fiber exits adjacent said front opening through forward portions of said top and bottom walls of said frame, each defined by a wall portion adjacent a cutout of a said top or bottom wall and complementary thereto along and across a front edge thereof, each said wall portion being fastenable to and unfastenable from said frame, and each said wall portion including upstanding wall section opposed and spaced from an upstanding wall section of said top or bottom wall adjacent said cutout thereof, with said upstanding wall sections directed into the enclosure;

said opposed upstanding wall sections each including secured thereto an elastomeric insert such that said elastomeric inserts are adjacent each other when said wall portion is fastened in position to said frame closing off the spacing therebetween but defining a virtual slot through which may be directed an optical fiber or fiber cable with said elastomeric inserts compressible thereagainst with nondeforming force, whereby said enclosure provides closed-off fiber exits permitting selected optical fibers or fiber cables to be directed from said interconnection interface and outwardly of said enclosure and directly to adjacent like enclosures positioned beneath or atop thereof without occupying any space adjoining said enclosure.

14. An enclosure as set forth in claim 13 wherein said elastomeric inserts are of high density microcellular open celled urethane.

* * * * *